United States Patent [19]

Mayo et al.

[11] Patent Number: 5,959,040

[45] Date of Patent: Sep. 28, 1999

[54] FILM-FORMING COMPOSITION SUITABLE FOR USE AS A MONOCOAT

[75] Inventors: Michael A. Mayo, Pittsburgh; Leigh-Ann Humbert, Allison Park, both of Pa.

[73] Assignee: PPG Industries Ohio, Inc., Cleveland, Ohio

[21] Appl. No.: 08/916,524

[22] Filed: Aug. 22, 1997

Related U.S. Application Data

[60] Provisional application No. 60/025,448, Sep. 4, 1996.

[51] Int. Cl.$^6$ ........................ C08F 20/36
[52] U.S. Cl. ............. 525/328.2; 525/167; 525/330.5
[58] Field of Search ..................... 525/328.2, 163, 525/330.5; 204/506

[56] References Cited

U.S. PATENT DOCUMENTS

| | | | |
|---|---|---|---|
| 3,479,328 | 11/1969 | Nordstrom | 260/86.1 |
| 4,147,688 | 4/1979 | Makhlouf et al. | 260/33.6 EP |
| 4,279,833 | 7/1981 | Culbertson et al. | 260/464 |
| 4,403,003 | 9/1983 | Backhouse | 427/407.1 |
| 4,543,276 | 9/1985 | Parekh | 427/388.3 |
| 5,071,904 | 12/1991 | Martin et al. | 524/458 |
| 5,098,974 | 3/1992 | Kania et al. | 526/310 |
| 5,300,328 | 4/1994 | Rehfuss | 427/388.3 |
| 5,336,566 | 8/1994 | Rehfuss | 428/524 |
| 5,356,669 | 10/1994 | Rehfuss et al. | 427/407.1 |
| 5,373,069 | 12/1994 | Rehfuss et al. | 525/456 |
| 5,412,049 | 5/1995 | Argyropoulos et al. | 526/312 |
| 5,451,656 | 9/1995 | Menovcik et al. | 528/288 |
| 5,474,811 | 12/1995 | Rehfuss et al. | 427/407.1 |
| 5,475,064 | 12/1995 | Menovcik et al. | 525/441 |
| 5,593,733 | 1/1997 | Mayo | 427/407.2 |
| 5,593,785 | 1/1997 | Mayo et al. | 428/423.1 |
| 5,646,214 | 7/1997 | Mayo | 525/10 |
| 5,663,244 | 9/1997 | Barancyk et al. | 525/456 |
| 5,709,950 | 1/1998 | Burgmann et al. | 428/423.1 |
| 5,759,694 | 6/1998 | Mayo et al. | 428/423.1 |
| 5,798,145 | 8/1998 | Barancyk et al. | 427/393.5 |

FOREIGN PATENT DOCUMENTS

| | | |
|---|---|---|
| 0 257 848 | 3/1988 | European Pat. Off. . |
| 0 594 068 | 4/1994 | European Pat. Off. . |
| 0 594 142 | 4/1994 | European Pat. Off. . |
| 0594071 | 4/1994 | European Pat. Off. . |
| 0 636 660 | 2/1995 | European Pat. Off. . |
| WO92/22616 | 12/1992 | WIPO . |
| WO94/10211 | 5/1994 | WIPO . |
| WO94/10212 | 5/1994 | WIPO . |
| WO94/10213 | 5/1994 | WIPO . |
| WO97/26304 | 7/1997 | WIPO . |

*Primary Examiner*—Robert Dawson
*Assistant Examiner*—D. Aylward
*Attorney, Agent, or Firm*—William J. Uhl; Kenneth J. Stachel; Krisanne Shideler

[57] ABSTRACT

A film-forming composition is provided comprising: (i) pigment; (ii) an aminoplast crosslinking agent containing methylol and/or methylol ether groups; and (iii) a polymer or oligomer selected from the group consisting of (a) an acrylic polymer or oligomer containing a plurality of groups of the structure:

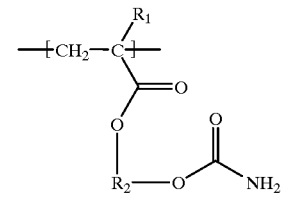

wherein $R_1$ is hydrogen or methyl and $R_2$ is a divalent group; (b) a polyester polymer or oligomer containing a plurality of terminal carbamate groups of the structure:

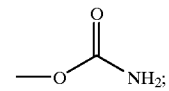

and (c) mixtures thereof. The film-forming composition is suitable for application over a substrate as a monocoat which exhibits a high level of acid etch resistance.

15 Claims, No Drawings

FILM-FORMING COMPOSITION SUITABLE FOR USE AS A MONOCOAT

This application claims the benefit of U.S. Provisional Application No. 60/025,448, filed Sep. 4, 1996.

FIELD OF THE INVENTION

The present invention relates to pigmented, aminoplast-curable film-forming compositions suitable for use as high gloss monocoats.

BACKGROUND OF THE INVENTION

Color-plus-clear coating systems involving the application of a colored or pigmented base coat to a substrate followed by the application of a transparent or clear topcoat to the base coat have become very popular as original finishes for automobiles. The color-plus-clear systems have outstanding gloss and distinctness of image. The clear coat is particularly important for these properties. However, such systems require the application of two coating layers and the use of two sets of application equipment.

Coating systems that employ hydroxy-aminoplast cure mechanisms are well known in the coating technology and provide many excellent coating properties. They are inexpensive and attractive, but it is widely recognized that such coatings have poor resistance to etching by acid. Acid etch resistance in coatings is becoming an increasingly desirable property, particularly for automotive coatings. Aminoplast cured coating systems of the prior art are not highly effective for providing protection against etching caused by acid rain. Moreover, when applied as a high gloss monocoat, such systems have been shown to fade, blush, crack, and/or lose gloss upon prolonged exposure to harsh ultraviolet (UV) light and humidity conditions.

Menovcik et al. in U.S. Pat. No. 5,475,064 discloses coating compositions containing aminoplasts and specific carbamate functional polyesters. These polyesters have pendant carbamate functionality and the reference does not disclose the use of the coatings for improved acid etch resistance or durability.

Culbertson et al. in U.S. Pat. No. 4,279,833 discloses specific carbamate functional acrylic monomers, polymers prepared therefrom, and coating compositions containing aminoplasts and these acrylic polymers. The reference does not disclose the use of such coating compositions as high gloss monocoats, nor does the reference recognize any advantage of carbamate functional polymers in coating compositions to improve acid etch resistance or durability.

Parekh in U.S. Pat. No. 4,543,276 discloses coating compositions containing urethane compounds and any of a number of polymers having any of various functional groups including carbamate. The reference does not disclose the use of such coating compositions as high gloss monocoats, nor does the reference recognize any advantage of carbamate functional polymers in coating compositions to improve acid etch resistance or durability.

It is desirable to provide a coating composition suitable for use as a high gloss monocoat that does not require application of a separate clear coat, utilizing inexpensive aminoplast curing agents yet having improved acid etch resistance properties and durability.

SUMMARY OF THE INVENTION

In accordance with the present invention, a film-forming composition is provided comprising (i) pigment; (ii) an aminoplast crosslinking agent containing methylol and/or methylol ether groups, present in the film-forming composition in amounts of about 25 to 50 percent by weight based on the total weight of resin solids in the film-forming composition; and (iii) a polymer or oligomer selected from the group consisting of (a) an acrylic polymer or oligomer present in the film-forming composition in amounts of about 20 to 75 percent by weight based on the total weight of resin solids in the film-forming composition and containing a plurality of groups of the structure:

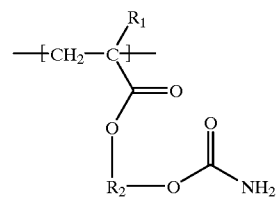

wherein $R_1$ is hydrogen or methyl and $R_2$ is a divalent linking group; (b) a polyester polymer or oligomer present in the film-forming composition in amounts of about 20 to 75 percent by weight based on the total weight of resin solids in the film-forming composition and containing a plurality of terminal carbamate groups of the structure:

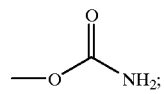

and (c) mixtures thereof, present in the film-forming composition in amounts of about 20 to 75 percent by weight based on the total weight of resin solids in the film-forming composition. The pigment to binder ratio of the film-forming composition is about 0.01 to 1.5. The film-forming composition is suitable for application over a substrate as a monocoat; that is, a high gloss pigmented coating. By "high gloss", it is meant that the cured coating has a 20° gloss and/or a DOI ("distinctness of image") measurement of at least about 80 as measured by standard techniques known to those skilled in the art.

DETAILED DESCRIPTION

The acrylic polymers or oligomers that can be used in the film-forming composition of the present invention are copolymers of one or more alkyl esters of acrylic acid or methacrylic acid, and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. The acrylic polymers or oligomers may contain hydroxyl functionality which can be incorporated into the acrylic polymer or oligomer through the use of hydroxyl functional monomers such as hydroxyethyl acrylate, hydroxypropyl acrylate, hydroxyethyl methacrylate, and hydroxypropyl methacrylate which may be copolymerized with the other acrylic monomers.

The acrylic polymer or oligomer may be prepared by solution polymerization techniques in the presence of suitable initiators such as organic peroxides or azo compounds, for example, benzoyl peroxide or N,N-azobis (isobutyronitrile). The polymerization may be carried out in an organic solution in which the monomers are soluble by techniques conventional in the art. Other polymerization techniques which may be used to prepare the acrylic polymer or oligomer include emulsion polymerization or suspension polymerization.

The acrylic polymer or oligomer contains a plurality of groups of the structure:

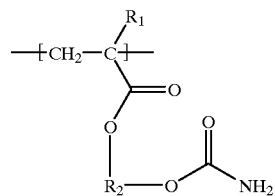

wherein $R_1$ is hydrogen or methyl and $R_2$ is a divalent linking group. $R_2$ may be linear or branched aliphatic such as methylene, ethylene, methyl ethylene, butylene, and the like; cycloaliphatic such as cyclohexylene; aromatic; saturated or unsaturated; and may be substituted. $R_2$ may have 2 to 20 carbon atoms and may include functional groups such as urethane, ester, amide, and the like, depending on the method used to prepare the monomer unit.

Carbamate functional groups such as those depicted in the structure above may be incorporated into the acrylic polymer or oligomer by copolymerizing the other acrylic monomers with a carbamate functional vinyl monomer, for example, a carbamate functional alkyl ester of methacrylic acid. These carbamate functional alkyl esters are prepared by reacting, for example, a hydroxyalkyl carbamate such as hydroxypropyl carbamate with methacrylic anhydride. In the reaction product of hydroxypropyl carbamate and methacrylic anhydride, $R_2$ has the structure:

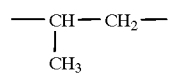

Other carbamate functional vinyl monomers are, for instance, the reaction product of a hydroxyl functional acrylic monomer such as hydroxyethyl (meth)acrylate, hydroxypropyl (meth)acrylate, and the like; a diisocyanate; and a hydroxyalkyl carbamate.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also cycloaliphatic diisocyanates can be employed. Examples include isophorone diisocyanate, which is preferred, and 4,4'-methylene-bis-(cyclohexyl isocyanate).

In one embodiment, the carbamate functional vinyl monomer is the reaction product of hydroxyethyl methacrylate, isophorone diisocyanate, and hydroxypropyl carbamate, and $R_2$ has the structure:

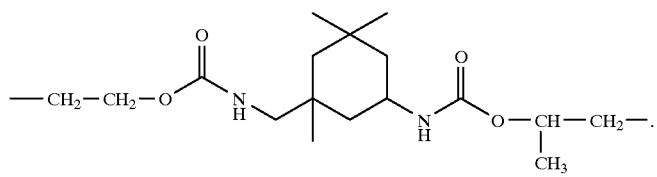

Still, other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328.

Carbamate groups can also be incorporated into the acrylic polymer or oligomer by reacting a hydroxyl functional acrylic polymer or oligomer with a low molecular weight carbamate functional material via a "transcarbamoylation" reaction. In this reaction a low molecular weight carbamate functional material derived from an alcohol or glycol ether is reacted with the hydroxyl groups of the acrylic polymer yielding a carbamate functional acrylic polymer or oligomer and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

The acrylic polymer or oligomer typically has a number average molecular weight of from about 1000 to 10,000, preferably from about 1000 to 5000 as determined by gel permeation chromatography using a polystyrene standard and has a carbamate equivalent weight less than about 2000, preferably within the range of about 140 to 800, based on equivalents of reactive carbamate groups. The equivalent weight is a calculated value based on the relative amounts of the various ingredients used in making the acrylic material and is based on solids of the acrylic polymer or oligomer.

The carbamate functional acrylic polymer or oligomer, when present in the film-forming composition, is used in amounts of about 20 to 75, preferably about 20 to 65 percent by weight based on weight of resin solids in the film-forming composition.

Linear or branched polyesters having terminal carbamate functionality may also be used in the formulation of the film-forming composition and may be prepared by the polyesterification of a polycarboxylic acid or anhydride thereof with polyols and/or an epoxide. Usually, the polycarboxylic acids and polyols are aliphatic or aromatic dibasic acids and diols. Transesterification of polycarboxylic acid esters is also possible.

The polyols which are usually employed in making the polyester include dihydric alcohols such as ethylene glycol, neopentyl glycol, 1,6-hexanediol, 2,2-dimethyl-3-hydroxypropyl-2,2-dimethyl-3-hydroxypropionate, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxyalkylated bisphenols, polyether glycols, for example, poly (oxytetramethylene) glycol and the like. Polyols of higher functionality may also be used. Examples include trimethylolpropane, trimethylolethane, pentaerythritol and the like.

The acid component of the polyester consists primarily of monomeric carboxylic acids or anhydrides thereof having 2 to 18 carbon atoms per molecule. Among the acids which are useful are cycloaliphatic acids and anhydrides such as phthalic acid, isophthalic acid, terephthalic acid, tetrahydrophthalic acid, hexahydrophthalic acid, methylhexahydrophthalic acid, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. Lower alkyl diacids, that is, acids having less than about 10 carbon atoms such as adipic acid, are preferred. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate may be used.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers or by reacting isocyanic acid with a hydroxyl functional polyester.

The polyester polymer or oligomer typically has a number average molecular weight of from about 300 to 10,000, preferably from about 300 to 3000 as determined by gel permeation chromatography using a polystyrene standard, and a carbamate equivalent weight within the range of about 140 to 2000, preferably about 140 to 800, based on equivalents of reactive terminal carbamate groups. The equivalent weight is a calculated value based on the relative amounts of the various ingredients used in making the polyester and is based on solids of the polyester.

The polyester polymer or oligomer, when present in the film-forming composition, is used in amounts of about 20 to 75, preferably about 20 to 65 percent by weight based on the total weight of resin solids in the film-forming composition.

When a mixture of acrylic and polyester polymers or oligomers is used in the film-forming composition, the total amount of the mixture present in the film-forming composition is about 20 to 75 percent by weight, based on the total weight of resin solids in the film-forming composition. The ratio of the acrylic to polyester polymers or oligomers in the mixture preferably is in the range of about 70:30 to about 40:60.

The film-forming composition of the present invention also includes an aminoplast crosslinking agent containing methylol and/or methylol ether groups. Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, and hexanol.

Preferably, the aminoplasts which are used are melamine-, urea-, or benzoguanamine-formaldehyde condensates etherified with an alcohol containing from one to four carbon atoms. The aminoplast is present in amounts of about 25 to 50, preferably about 30 to 45 percent by weight based on the total weight of resin solids in the film-forming composition.

The film-forming composition also contains pigments to give it color. Color pigments conventionally used in surface coatings are suitable and include inorganic pigments such as titanium dioxide, iron oxide, chromium oxide, lead chromate, micas and carbon black, and organic pigments such as phthalocyanine blue and phthalocyanine green. In general, the pigment is incorporated into the film-forming composition in amounts of about 1 to 80 percent by weight based on weight of coating solids.

Usually, the film-forming composition will also preferably contain catalysts to accelerate the cure of the aminoplast and carbamate groups. Examples of suitable catalysts are acidic materials and include acid phosphates and sulfonic acid or a substituted sulfonic acid such as dodecylbenzene sulfonic acid or paratoluene sulfonic acid. The catalyst is usually present in an amount of about 0.5 to 5.0 percent by weight, preferably about 0.5 to 2 percent by weight, based on the total weight of resin solids in the film-forming composition. Optional ingredients such as, for example, plasticizers, surfactants, thixotropic agents, fillers, anti-gassing agents, organic cosolvents, flow controllers, anti-oxidants, UV light absorbers and similar additives conventional in the art may be included in the composition.

These ingredients are typically present at up to 40 percent by weight based on total resin solids.

In the film-forming composition of the present invention, preferably the equivalent ratio of the pendant or terminal carbamate groups in the polymers or oligomers to methylol or methylol ether groups in the aminoplast is from about 0.5 to 2:1 and is sufficient to form a crosslinked film. The resultant crosslinked coating contains a substantial number of urethane crosslinks which arise from reaction of the terminal or pendant carbamate groups with the aminoplast, thereby providing a high level of acid etch resistance and durability.

Preferably, prior to crosslinking, the film-forming composition comprising the polymer(s) or oligomer(s) having the pendant or terminal carbamate groups and the aminoplast has a theoretical hydroxyl value less than 50, preferably less than 25, and more preferably 0, based on solid weight of the film-forming composition, excluding any hydroxyl functionality associated with N-methylol groups such as those in an aminoplast.

By "theoretical hydroxyl value", it is meant the calculated value based on the relative amounts of the various ingredients used in making the film-forming composition rather than the actual hydroxyl value which is measured on the film-forming composition itself by conventional analytical techniques. The resultant crosslinked coating contains a substantial number of urethane crosslinks which arise from reaction of the terminal or pendant carbamate groups with the aminoplast, thereby providing a high level of acid etch resistance.

The film-forming compositions can be applied to various substrates to which they adhere. For instance, the substrates can have other coating compositions such as primer coatings and/or electrodeposited primer coatings and/or pretreatment composition treatments and/or adhesion promoting treatments for plastic substrates all of which are those well known to those skilled in the art. The compositions can be applied by conventional means including brushing, dipping, flow coating, spraying and the like, but they are most often applied by spraying. The usual spray techniques and equipment for air spraying and electrostatic spraying and either manual or automatic methods can be used. Application as a monocoat is preferably over previously coated During application of the composition to the substrate, a film is formed on the substrate. Typically, the film thickness will be about 1.0 to 3.0 mils (25.4 to 76.2 microns), preferably about 1.5 to 2.2 mils (38.1 to 55.9 microns) in thickness. Multiple coating layers may be applied to develop the optimum appearance. Usually between coats, the previously applied coat is flashed, that is, exposed to ambient conditions for about 1 to 20 minutes.

After application of the film-forming composition to the substrate, the coated substrate is heated to cure the coating. In the curing operation, solvents are driven off and the film-forming materials are crosslinked. The heating or curing operation is usually carried out at a temperature in the range of from 160–350° F. (71–177° C.) but if needed, lower or higher temperatures may be used as necessary to activate crosslinking mechanisms. As the monocoat coating with the high gloss, no clear coat is necessary over or on top of the cured monocoat. Preferably, the monocoat is present in the absence of any clear coat to attain the desired gloss of the uppermost or pigment-containing coating on the substrate.

Illustrating the invention are the following examples that are not to be considered as limiting the invention to their details. All parts and percentages in the examples as well as throughout the specification are by weight unless otherwise indicated. Also molecular weights as number average, ("Mn"), and weight average, ("Mw"), were determined by gel permeation chromatography ("GPC") using a polystyrene standard.

EXAMPLE A

A hydroxyl functional acrylic polymer was prepared from the following ingredients:

| Ingredients | Parts by Weight |
|---|---|
| Initial Charge | |
| xylene | 10.7 |
| SOLVESSO 100[1] | 10.7 |
| isobutanol | 4.3 |
| Charge I | |
| hydroxypropyl acrylate | 40.0 |
| butyl methacrylate | 19.0 |
| butyl acrylate | 19.0 |
| styrene | 20.0 |
| acrylic acid | 2.0 |
| t-dodecyl mercaptan | 0.5 |
| Charge II | |
| xylene | 8.7 |
| SOLVESSO 100 | 6.4 |
| VAZO 67[2] | 5.0 |
| Charge III | |
| SOLVESSO 100 | 1.1 |
| VAZO 67 | 0.4 |
| Charge IV | |
| SOLVESSO 100 | 1.1 |
| VAZO 67 | 0.4 |

[1]Aromatic solvent mixture available from Exxon Chemicals America.
[2]2,2'-dimethylazobis(isobutyronitrile), commercially available from E. I. Du Pont de Nemours and Company.

The initial charge was added to a 5-liter round bottom 4-neck flask equipped with mechanical agitation, nitrogen inlet, reflux condenser, and two dropping funnels (using a nitrogen blanket). The charge was heated to reflux (115° C.). At reflux, Charges I and II were simultaneously and uniformly added over a two-hour period maintaining reflux conditions. Upon completion of Charges I and II, Charge III was added and the reaction held for one hour. Charge IV was added and the reaction held one more hour. The polymer was characterized as having 69 percent solids, hydroxyl value of 95, and the peak molecular weight of 7000, which is the molecular weight exhibited by the highest percentage of material on the GPC curve as opposed to an average.

EXAMPLES B AND C

A hydroxyl functional polyester polymer, Example B, and a carbamate functional polyester polymer, Example C, were prepared from the components of the following Table I:

TABLE I

| Ingredients in Amounts Based on Parts by Weight | Example B | Example C |
|---|---|---|
| 2,2-dimethyl-3-hydroxypropyl-2,2-dimethyl-3-hydroxypropyl propionate | 196.8 | 196.8 |
| deionized water | 10.0 | 10.0 |
| trimethylolpropane | 42.9 | 42.9 |
| butyl stannoic acid | 0.6 | 0.6 |
| triphenylphosphite | 0.8 | 0.8 |
| deionized water | 3.0 | 3.0 |
| methylhexahydrophthalic anhydride | 158.3 | 158.3 |
| deionized water | 10.0 | 10.0 |
| DOWANOL PM[1] | | 3.0 |
| butyl stannoic acid | | 0.5 |
| triphenylphosphite | | 0.5 |
| DOWANOL PM | | 2.0 |
| DOWANOL PM carbamate (37% solution in DOWANOL PM)[2] | | 318.9 |
| DOWANOL PM | 10.0 | |
| DOWANOL PM | 105.0 | |

[1] 1-methoxy-2-propanol available from Dow Chemical Co.
[2] Reaction product of DOWANOL PM and urea.

For both Examples B and C, the first ingredient was charged to a suitable reactor equipped with a glycol recovery column. Deionized $H_2O$ was added to the reactor as a rinse for the first ingredient. Trimethylolpropane, butyl stannoic acid, and triphenylphosphite were then added to the reactor, followed by a deionized $H_2O$ rinse. Methylhexahydrophthalic anhydride with a subsequent deionized $H_2O$ rinse was then added to the reactor followed by heating the reaction mixture to 77° C. and sparging with nitrogen for 20 minutes. The reaction mixture temperature was then raised to 210° C. and $H_2O$ was removed from the reactor with the nitrogen sparge. The reaction was continued until an acid value of 10.2 was obtained. The hydroxyl functional reaction product of Example B had a hydroxyl value of 156.6. The reaction product was thinned to 75.4% solids with DOWANOL PM. The final resin was characterized as having Mw=2272 and Mn=1346.

The procedure for the preparation of EXAMPLE C was identical to that for EXAMPLE B, up through achieving an acid value of 10.2 for the reaction product. At this point for EXAMPLE C, the batch was then cooled to 140° C. The intermediate resin had a hydroxyl value of 156.6. DOWANOL PM and butyl stannoic acid were added to the reactor as a slurry, followed by addition of triphenylphosphite and a DOWANOL PM rinse. The DOWANOL PM carbamate solution was then added to the reactor over a period of four hours. During the addition, DOWANOL PM was distilled from the reactor under reduced pressure. Upon completion of the addition of the DOWANOL PM carbamate solution, a DOWANOL PM rinse was added to the reactor. The reaction was continued until DOWANOL PM evolution stopped. A sample of resin (90 parts) was removed from the reactor; the remaining resin was diluted with DOWANOL PM. The resin prior to dilution had a residual hydroxyl value of 19.4 and an acid value of 8.5. After dilution, the resin had a measured solids content of 71.2% and a Gardner-Holt viscosity of Z1+. The carbamate functional polyester polymer had an Mn of 720 and an Mw of 2220.

EXAMPLES D AND E

A hydroxyl functional acrylic polymer, Example D, and a carbamate functional acrylic polymer, Example E were prepared from the ingredients of the following Table II:

TABLE II

| Ingredients in Amounts Based on Parts by Weight | Example D | Example E |
|---|---|---|
| EXXATE 600[1] | 154.3 | 154.3 |
| LUPERSOL 555M60[2] | 21.1 | 21.1 |
| EXXATE 600 | 21.1 | 21.1 |
| butyl methacrylate | 122.6 | 122.6 |
| hydroxypropyl acrylate | 84.6 | 84.6 |
| methyl styrene dimer | 4.2 | 4.2 |
| EXXATE 600 | 6.5 | 6.5 |
| di-t-amyl peroxide | 2.1 | 2.1 |
| EXXATE 600 | 10.3 | 10.3 |
| EXXATE 600 | 2.5 | 2.5 |
| triphenylphosphite | | 0.4 |
| EXXATE 600 | | 2.5 |
| DOWANOL PM | | 2.5 |
| butyl stannoic acid | | 0.5 |
| triphenylphosphite | | 0.3 |
| DOWANOL PM | | 2.0 |
| DOWANOL PM carbamate (37% solution in DOWANOL PM) | | 219.1 |
| DOWANOL PM | | 3.0 |
| ethyl 3-ethoxy propionate | | 42.0 |
| DOWANOL PM | | 42.0 |

[1] oxo-heyl acetate solvent available from Exxon Chemicals Co.
[2] t-amyl peroxyacetate available from Atochem North America.

For both Examples D and E, the first ingredient was charged to a suitable reactor under an $N_2$ blanket and heated to 155° C. The next two ingredients were mixed together and added to the reactor at a constant rate over 3.5 hours. Addition of a mixture of hydroxypropyl acrylate, butyl methacrylate, methyl styrene dimer, and EXXATE 600 was begun 15 minutes after the beginning of the first addition and continued at a constant rate over 3 hours. A rinse of EXXATE 600 followed both additions. The reaction was held at temperature for 1 hour. A mixture of di-t-amyl peroxide and EXXATE 600 was then added to the reactor over a period of 0.5 hours, followed by an EXXATE 600 rinse. The reaction was held for an additional 3 hours.

The procedure for preparation of EXAMPLE E was identical to that for EXAMPLE D up through the 3-hour hold which completed the acrylic polymerization. At this point, the reaction was then cooled to 140° C. While the reaction was cooling, triphenylphosphite was added to the reaction, followed by an EXXATE 600 rinse. Solvent was then removed from the reaction under reduced pressure. The carbamoylation process was continued as in Example C above for a polyester polymer except for an acrylic polymer. Also, the addition period for the DOWANOL PM carbamate in DOWANOL PM solution was 3 rather than 4 hours. The resulting resin prior to dilution had a residual hydroxyl value of 26.5. The resin was diluted with a 1:1 mixture of ethyl 3-ethoxypropionate and DOWANOL PM. After dilution, the resin had a measured solids content of 66.5%, a Gardner-Holt viscosity of U-, and a Mw of 2048.

The following examples (1–7) show the preparation of various pigmented monocoat film-forming compositions prepared with the polymers of Examples A, B, C, D, and E, and an aminoplast curing agent. There are 1.4 grams of pigment solid weight for every 100 grams of resin solid weight in these examples. Thus, the P/B or pigment to binder ratio is 1.4/100 or 0.014.

EXAMPLE 1 (Comparative)

A pigmented monocoat film-forming composition was prepared by mixing together the following ingredients:

| Ingredients | Solid Weight in grams | Solution Weight in grams |
| --- | --- | --- |
| SOLVESSO 100 | — | 10.1 |
| Methyl n-amyl ketone | — | 21.0 |
| Xylene | — | 11.0 |
| Butyl CELLOSOLVE acetate[1] | — | 4.0 |
| TINUVIN 328[2] | 1.5 | 1.5 |
| TINUVIN 900[3] | 1.5 | 1.5 |
| Rheology modifier[4] | 1.2 | 2.8 |
| CYMEL 1130[5] | 41.8 | 41.8 |
| Hydroxyl functional acrylic polymer of Example A | 50.6 | 72.3 |
| Tint paste[6] | 7.8 | 17.9 |
| Ethanol | — | 6.0 |
| TINUVIN 292[7] | 0.4 | 0.4 |
| Polybutylacrylate solution[8] | 0.4 | 0.7 |
| DDBSA solution[9] | 0.7 | 1.0 |

[1] 2-butoxy ethanol acetate available from Union Carbide Co.
[2] Substituted benzotriazole UV light stabilizer available from Ciba Geigy Corporation.
[3] Substituted benzotriazole UV light stabilizer available from Ciba Geigy Corporation.
[4] Polymeric microparticle dispersion prepared according to U.S. Pat. No. 4,147,688.
[5] A fully alkylated, mixed methoxy/butoxy functional aminoplast resin available from CYTEC Industries.
[6] Black pigment tint paste containing 17.9% carbon black, 41.0% acrylic grind vehicle and 41.1% CYMEL 1130 based on solids.
[7] Sterically hindered amine light stabilizer available from Ciba Geigy Corporation.
[8] Flow control agent having a $M_w$ of about 6700 and a $M_n$ of about 2600, made in xylene at 62.5% solids.
[9] Dodecylbenzene sulfonic acid solution neutralized with diisopropanolamine.

EXAMPLES 2 THROUGH 7

Pigmented monocoat film-forming compositions were prepared by mixing together the ingredients in the order as shown in the following Table III:

The film-forming compositions of EXAMPLES 1–7 of Table III were applied over electrocoated steel substrate for comparative testing. The electrocoat used on the steel is commercially available from PPG Industries, Inc. and is identified as ED-5000. The monocoat film forming compositions of EXAMPLES 1–7 were spray applied in two coats to the electrocoated steel panels at a temperature of about 75° F. (24° C.). Approximately, a 90-second flash time was allowed between the two coats. The resulting coating was then allowed to air flash at 75° F. (24° C.) for 10 minutes before baking at 275° F. (135° C.) for 25 minutes to cure the pigmented monocoat composition. The test results for the cured monocoat compositions are shown in the following Table IV.

TABLE IV

| Clearcoat | Resin Type | Acid Etch[1] | 20° Gloss/ DOI[2] | QUV[3] Hours/Gloss |
| --- | --- | --- | --- | --- |
| Example 1 | Acrylic polyol | 8 | 90/97 | 1050/13 color faded |
| Example 2 | Acrylic polyol | 10 | 85/93 | 1505/82 color faded |
| Example 3 | Polyester polyol | 10 | 85/92 | 1505/56 color faded |
| Example 4 | 50/50 Acrylic polyol/ Polyester carbamate | 5 | 99/90 | 1500/41 color faded |
| Example 5 | 60/40 Polyester carbamate/ Acrylic carbamate | 2 | 91/97 | 2460/70 color faded |
| Example 6 | Polyester carbamate | 2 | 90/96 | 2460/54 color faded |
| Example 7 | Acrylic carbamate | 6 | 100/95 | 2505/58 color faded |

| | Examples (Weight in grams [Solid Weight/Solution Weight]) | | | | | |
| --- | --- | --- | --- | --- | --- | --- |
| Ingredients | 2 | 3 | 4 | 5 | 6 | 7 |
| n-amyl propionate | —/20.0 | —/20.0 | —/30.0 | —/25.0 | —/25.0 | —/20.0 |
| ethyl 3-ethoxy propionate | — | — | —/5.0 | —/5.0 | —/5.0 | — |
| Methyl n-amyl ketone | —/20.0 | —/20.0 | —/22.0 | —/10.5 | —/12.5 | —/20.0 |
| TINUVIN 328 | 1.5 | 1.5 | 1.5 | 1.5 | 1.5 | 1.5 |
| TINUVIN 900 | 1.5 | 1.5 | 1.5 | 1.5 | 1.5 | 1.5 |
| Silica dispersion[1] | 5.4/12.6 | 5.4/12.6 | 5.4/12.6 | 5.4/12.6 | 5.4/12.6 | 5.4/12.6 |
| CYMEL 1130 | 31.8 | 31.8 | 31.8 | 31.8 | 31.8 | 31.8 |
| Hydroxyl functional acrylic polymer of Example D | 57.4/83.6 | — | — | — | — | — |
| Hydroxyl functional polyester polymer of Example B | — | 54.1/76.1 | — | — | — | — |
| Hydroxyl functional acrylic polymer of Example A | — | — | 26.5/52.1 | — | — | — |
| Carbamate functional polyester polymer of Example C | — | — | 30.9/43.3 | 36.4./51.0 | 57.4/80.4 | — |
| Carbamate functional acrylic polymer of Example E | — | — | — | 21.1/31.6 | — | 57.4/86.1 |
| Tint paste | 7.8/17.9 | 7.8/17.9 | 7.8/17.9 | 7.8/17.9 | 7.8/17.9 | 7.8/17.9 |
| TINUVIN 292 | 0.4 | 0.4 | 0.4 | 0.4 | 0.4 | 0.4 |
| Polybutylacrylate solution | 0.4/0.7 | 0.4/0.7 | 0.4/0.7 | 0.4/0.7 | 0.4/0.7 | 0.4/0.7 |
| DDBSA solution | 1.0/1.4 | 1.0/1.4 | 1.0/1.4 | 1.0/1.4 | 1.0/1.4 | 1.0/1.4 |

[1] Dispersion of Aerosil R-812 silica (Degussa Chemicals) in acrylic polyol of Example A at a ratio of acrylic to silica of 4.4/1.0 based on solids.

TABLE IV-continued

| Clearcoat | Resin Type | Acid Etch[1] | 20° Gloss/ DOI[2] | QUV[3] Hours/Gloss |
|---|---|---|---|---|

[1]A solution of 350 parts deionized water and 12 parts sulfurous acid was prepared. The acid solution was sprayed onto the panels using a polyethylene spray bottle, giving a distribution of drop sizes up to one quarter inch. Approximately 1.5 grams of solution was applied per 2 × 4 inch panel. The panels were then placed in an oven at 120° F. (49° C.) for 20 minutes. The panels were removed from the oven and the spray/bake procedure was repeated two more times to give a total of 60 minutes at 120° F. After the third cycle, the panels were washed with soap and water and dried, then rated for acid etch resistance on a scale of 0–10 based on standard test panels (0 = no observable etch; 10 = severe etching).
[2]20° gloss measured by a Glossgard II glossmeter from Pacific Scientific. DOI (distinction of image) measured using a Dorigon II DOI meter from Hunter Lab.
[3]QUV apparatus equipped with UVB313 bulbs, operating with cycle times of 8 hours UV light at 70° C. and 4 hours condensation at 50° C. Data reported is total hours to failure and the 20° gloss at failure.

The data summarized in Table IV illustrate that the monocoat compositions comprising all acrylic polyol (Examples 1 and 2) or all polyester polyol (Example 3) although having excellent gloss and DOI, have poor acid etch resistance and poor QUV durability. Blending the acrylic polyol with polyester carbamate (Example 4) moderately improved the acid etch resistance and QUV durability while maintaining acceptable gloss and DOI. Additionally, even more dramatic improvements in acid etch resistance and QUV durability were achieved in the all carbamate systems (Examples 5, 6 and 7).

Therefore, we claim:

1. A curable film-forming composition comprising (i) pigment; (ii) an aminoplast crosslinking agent containing methylol and/or methylol ether groups, present in the film-forming composition in amounts of about 25 to 50 percent by weight based on the total weight of resin solids in the film-forming composition; and (iii) a mixture of (a) an acrylic polymer or oligomer containing a plurality of groups of the structure:

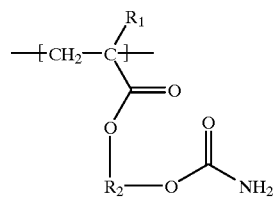

wherein $R_1$ is hydrogen or methyl and $R_2$ is a divalent linking group; and (b) a polyester polymer or oligomer containing a plurality of terminal carbamate groups of the structure:

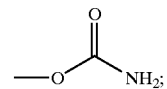

wherein said mixture is present in the film-forming composition in amounts of about 20 to 75 percent by weight based on the total weight of resin solids in the film-forming composition; and wherein the pigment to binder ratio of the film-forming composition is about 0.01 to 1.5 and the film-forming composition is suitable for application over a substrate as a monocoat.

2. The film-forming composition of claim 1 wherein prior to crosslinking the film-forming composition has a theoretical hydroxyl value less than 50 based on the total solid weight of the film-forming composition, excluding any hydroxyl functionality associated with N-methylol groups.

3. The film-forming composition of claim 1 wherein the acrylic polymer or oligomer is present in the film-forming composition in amounts of about 20 to 65 percent by weight based on the total weight of resin solids in the film-forming composition.

4. The film-forming composition of claim 3 wherein the acrylic polymer or oligomer has an equivalent weight of from about 140 to 800 based on equivalents of carbamate groups.

5. The film-forming composition of claim 3 wherein $R_2$ has from about 2 to 20 carbon atoms.

6. The film-forming composition of claim 5 wherein $R_2$ has the structure:

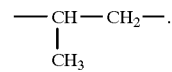

7. The film-forming composition of claim 5 wherein $R_2$ has the structure:

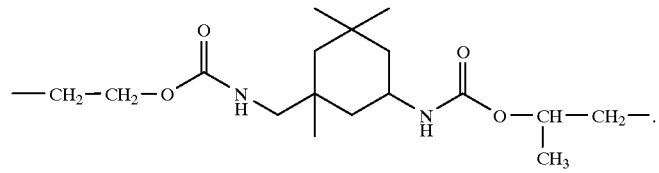

8. The film-forming composition of claim 1 wherein the polyester polymer or oligomer is present in the film-forming composition in amounts of about 20 to 65 percent by weight based on the total weight of resin solids in the film-forming composition.

9. The film-forming composition of claim 1 wherein the aminoplast is present in the film-forming composition in amounts of about 30 to 45 percent based on the total weight of resin solids in the film-forming composition.

10. The film-forming composition of claim 1 wherein said aminoplast is a condensate of melamine with formaldehyde and optionally an alcohol containing from 1 to 4 carbon atoms.

11. The film-forming composition of claim 1 wherein the equivalent ratio of carbamate groups to methylol or methylol ether groups is from about 0.5 to 2:1 and is sufficient to form a crosslinked film.

12. The film-forming composition of claim 1 present as a monocoat on electrocoated substrate.

13. The film-forming composition of claim 12 which is present from an application of two coats with a flash time period between the application of the each coat.

14. The film-forming composition of claim 1 wherein both the acrylic and polyester polymer or oligomer are present in an amount in the range of about 20 to 75 percent by weight.

15. The film-forming composition of claim 14 wherein the acrylic and polyester polymer or oligomer are present in a ratio of 40 to 60.

* * * * *